United States Patent

Nienhueser et al.

(10) Patent No.: US 10,829,110 B2
(45) Date of Patent: Nov. 10, 2020

(54) METHOD AND DEVICE FOR ADAPTING A DRIVING BEHAVIOR OF A SEMI, HIGHLY OR FULLY AUTOMATED VEHICLE

(71) Applicant: Robert Bosch GmbH, Stuttgart (DE)

(72) Inventors: Dennis Nienhueser, Renningen (DE); Heiko Freienstein, Weil der Stadt (DE); Holger Andreas Banzhaf, Laichingen (DE); Joachim Boerger, Stuttgart (DE); Johannes Foltin, Ditzingen (DE); Markus Koehler, Stuttgart (DE); Markus Schuetz, Stuttgart (DE); Markus Mazzola, Stuttgart (DE); Miriam Schreiber, Leonberg (DE); Nandor Nagy, Renningen (DE); Steffen Knoop, Hohenwettersbach (DE); Steffen Waeldele, Weil der Stadt (DE); Thomas Schamm, Karlsruhe (DE); Thomas Kiess, Remseck (DE); Hans-Christian Swoboda, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/157,958

(22) Filed: Oct. 11, 2018

(65) Prior Publication Data
US 2019/0126911 A1 May 2, 2019

(30) Foreign Application Priority Data
Oct. 26, 2017 (DE) .................. 10 2017 219 243

(51) Int. Cl.
*B60W 30/00* (2006.01)
*G05D 1/00* (2006.01)
(Continued)

(52) U.S. Cl.
CPC .......... *B60W 30/00* (2013.01); *G05D 1/0088* (2013.01); *B60W 10/04* (2013.01); *B60W 10/18* (2013.01);
(Continued)

(58) Field of Classification Search
None
See application file for complete search history.

(56) References Cited

U.S. PATENT DOCUMENTS 7,164,117 B2 * 1/2007 Breed ............... B60R 21/01516
 250/208.1
9,086,292 B2 * 7/2015 Horvitz ............. G01C 21/3697
(Continued)

FOREIGN PATENT DOCUMENTS

DE 102008038816 A1 2/2010
DE 102017103973 A1 8/2017

*Primary Examiner* — Kaveh Abrishamkar
(74) *Attorney, Agent, or Firm* — Norton Rose Fulbright US LLP; Gerard Messina

(57) ABSTRACT

A method for adapting a driving behavior of a semi, highly or fully automated vehicle and includes the following steps: receiving passenger compartment data; ascertaining a safety state of at least one vehicle occupant which in particular represents an injury probability of the vehicle occupant in the event of an accident, based on the passenger compartment data; and adapting the driving behavior of the vehicle based on the safety state of the at least one vehicle occupant.

24 Claims, 2 Drawing Sheets

(51) Int. Cl.
*B60W 10/04* (2006.01)
*B60W 10/18* (2012.01)
*B60W 10/20* (2006.01)

(52) U.S. Cl.
CPC ......... *B60W 10/20* (2013.01); *B60W 2400/00* (2013.01); *B60W 2710/18* (2013.01); *B60W 2710/20* (2013.01); *B60W 2720/106* (2013.01); *B60W 2720/125* (2013.01); *B60W 2754/30* (2020.02)

(56) References Cited

U.S. PATENT DOCUMENTS

| | | | | |
|---|---|---|---|---|
| 9,517,767 | B1* | 12/2016 | Kentley | B60Q 1/26 |
| 9,821,801 | B2* | 11/2017 | Di Cairano | B60W 30/10 |
| 10,386,853 | B2* | 8/2019 | Borngraber | G05D 1/0285 |
| 10,387,962 | B1* | 8/2019 | Potter | B60R 25/04 |
| 10,481,613 | B2* | 11/2019 | Schroeder | B60W 30/12 |
| 2008/0161986 | A1* | 7/2008 | Breed | G08G 1/163 |
| | | | | 701/23 |
| 2010/0117814 | A1* | 5/2010 | Lermer | A61B 5/18 |
| | | | | 340/439 |
| 2010/0324797 | A1* | 12/2010 | Fritz | B60W 10/184 |
| | | | | 701/96 |
| 2015/0149088 | A1* | 5/2015 | Attard | G05D 1/021 |
| | | | | 701/538 |
| 2015/0274165 | A1* | 10/2015 | von Collani | B60W 30/143 |
| | | | | 701/70 |
| 2016/0363935 | A1* | 12/2016 | Shuster | B60L 7/10 |
| 2016/0378112 | A1* | 12/2016 | Ljubuncic | B60W 30/16 |
| | | | | 701/45 |
| 2017/0080900 | A1* | 3/2017 | Huennekens | B60R 25/31 |
| 2017/0136842 | A1* | 5/2017 | Anderson | B60G 17/019 |
| 2018/0029706 | A1* | 2/2018 | Baruch | H04W 76/14 |
| 2018/0201138 | A1* | 7/2018 | Yellambalase | B60L 3/0046 |
| 2018/0281627 | A1* | 10/2018 | Ali | B60N 2/0276 |
| 2018/0362028 | A1* | 12/2018 | Prokhorov | B62D 15/0255 |
| 2019/0206255 | A1* | 7/2019 | Tao | H04W 4/46 |
| 2019/0251376 | A1* | 8/2019 | Stoffel | B60Q 3/76 |
| 2019/0318181 | A1* | 10/2019 | Katz | B60W 40/08 |

* cited by examiner

METHOD AND DEVICE FOR ADAPTING A DRIVING BEHAVIOR OF A SEMI, HIGHLY OR FULLY AUTOMATED VEHICLE

RELATED APPLICATION INFORMATION

The present application claims priority to and the benefit of German patent application no. 10 2017 219 243.7, which was filed in Germany on Oct. 26, 2017, the disclosure which is incorporated herein by reference.

FIELD OF THE INVENTION

The present invention relates to a method and to a device for adapting a driving behavior of a semi, highly or fully automated vehicle.

BACKGROUND INFORMATION

Patent document DE 10 2008 038 816 A1 discusses a method and a device for supporting the operation of a vehicle. A state of a driver of the vehicle with respect to the operation of the vehicle and a driving situation in which the vehicle is situated are detected. Depending on the state of the driver and on the driving situation, at least one measure is taken to improve the state of the driver with respect to the operation of the vehicle and/or a driving behavior of the vehicle.

SUMMARY OF THE INVENTION

The present invention describes a method for adapting a driving behavior of a semi, highly or fully automated vehicle and includes the following steps:
  receiving passenger compartment data;
  ascertaining a safety state of at least one vehicle occupant which in particular represents an injury probability of the vehicle occupant in the event of an accident, based on the passenger compartment data; and
  adapting the driving behavior of the vehicle based on the safety state of the at least one vehicle occupant.

The safety state results, in particular, from a possible injury severity and/or injury probability in the theoretical case of an accident and/or a malfunction of the automated vehicle. Different variables may be included in the determination of the possible injury severity and/or injury probability, on which the safety state is based, such as the seat belt fastening status, the instantaneous sitting posture, whether the occupant is standing, sitting or lying, whether the occupant is moving, whether the occupant is walking around in the vehicle, whether the occupant is looking to the side or to the rear in the driving direction, whether the occupant is holding objects in his or her hand or has objects placed in front of himself or herself, whether the occupant has extended a tray, which may possibly limit his or her deceleration path, whether an occupant is holding on, in particular on a handle, or is standing freely, whether an occupant is carrying baggage on the back, whether an occupant is pregnant or carrying a child, and many other parameters which influence the safety of vehicle occupants during an accident.

The passenger compartment data may be, for example, video recordings of the vehicle passenger compartment, which are detected with the aid of one or multiple passenger compartment camera(s), for example. Passenger compartment data may furthermore also be understood to mean data of specific sensors which may be situated in the passenger compartment. These include, for example, the data of belt buckle sensors, handle sensors (implemented by tensile and/or capacitive sensors), seat occupancy sensors such as seat mats or contact sensors, sensors for ascertaining further passenger compartment states, such as of seat positions, inclinations of backrests or fold-out/extension status of tables or other trays, and further sensors used to determine a present state in the vehicle passenger compartment.

The driving behavior may relate to the overall control of the vehicle, in particular the longitudinal and/or transverse guidance of the vehicle. The driving behavior may relate to both the behavior of the vehicle during starting and in the moved state.

The method is carried out, in particular, in a control loop so that a continuous adaptation of the driving behavior is possible, and it is possible to respond promptly to changes of a safety state of a vehicle occupant. In this way, the safety of the at least one vehicle occupant is enhanced.

The adaptation of the driving behavior may take place based on the safety state of a vehicle occupant. If multiple vehicle occupants are situated in the vehicle, the adaptation may be based on the safety states of all passengers. For this purpose, either the safety states may be individually ascertained, or a shared safety state may be ascertained for all occupants. It is also possible to combine the individual safety states in a weighted manner. For example, it is also possible to select only the safety state of the vehicle occupant for the adaptation which, compared to all further safety states, is the worst, i.e., the safety state of the vehicle occupant whose injury probability and/or possible injury severity is the highest. In this way, it is ensured that the safety of each vehicle occupant is ensured or may be maintained at a very high level.

The ascertainment of the safety state may be determined independently of an instantaneously present driving situation (ascertainable from surroundings data), such as the vehicle speed. The adaptation of the driving behavior then takes place based on the safety state and in such a way that an establishable minimum safety level of the vehicle occupant is ensured. The minimum safety level may be understood to mean, for example, that, for an established accident type at a predefined speed, an average injury severity of the occupant is expected which is below a predefined maximum acceptable injury severity. For example, this may be established in such a way that no more than minor injuries, such as possibly contusions, would be likely. For example, the safety state is then based only on the pieces of information extractable from the passenger compartment data, such as seat belt fastening status, movement status, position of the occupant, and objects present in the immediate vicinity of the occupant.

The method offers the advantage that the safety of the vehicle occupant is enhanced. Moreover, the driver actively experiences the topic of safety in the vehicle, whereby the visibility of the topic is increased, and a safety awareness is created in the vehicle occupant. This enhances the safety for the occupant overall. Moreover, a driver is not necessarily actively asked to do something, whereby the acceptance of an automated vehicle could be impaired. The vehicle occupant is able to act with self-determination since the vehicle adapts individually to his or her behavior. This self-determination is known to cause positive feelings, which results in an increase in the attractiveness and acceptance of automated vehicles. Depending on the specific embodiment, the vehicle occupant does not experience any restrictions by warnings of the system.

If the starting characteristic of a vehicle is adapted, injuries or falls of unsecured passengers may moreover be decreased or entirely avoided. As a result of fewer falls and injuries, a corresponding vehicle has to carry out fewer emergency stops, whereby the traffic flow is improved. Moreover, vehicles in which the method is implemented may distinguish themselves from today's modes of transportation, such as buses and trains, and offer an increased degree of safety.

In one further specific embodiment of the method, it includes the additional step of receiving surroundings data, the ascertainment of the safety state and/or the adaptation of the driving behavior taking place based on the ascertained surroundings data.

The determination of the safety state and/or the adaptation of the driving behavior may also take place as a function of the instantaneously present driving situation, which is determined, for example, by the driving direction, the driving surroundings (such as freeway trip, city trip, cross country trip), the vehicle speed of the host road user and, in particular, of further road users situated in surroundings of the vehicle. For this purpose, the method may include the further step of receiving surroundings data, the adaptation of the driving behavior also taking place based on the received surroundings data.

Received surroundings data may be understood to mean, for example, images of a vehicle camera or of further surroundings sensors, such as radar or LIDAR sensors. Furthermore, this may also be understood to mean received signals, which include pieces of information about the surroundings of the vehicle or the planned route of the vehicle. These pieces of information may be received by a radio transmitter or an Internet server, for example. Pieces of position or GNSS/GPS information may also supply valuable surroundings signals, in particular in combination with map data.

When the safety state drops below a predefined threshold value, an adaptation of the driving behavior takes place in such a way that an improvement in the safety state (an enhancement corresponds to an improvement in this example, a decrease corresponds to a worsening of the safety state) is to be expected. For example, the speed may be reduced, or driving routes in which the safety state is classified as being higher may be selected.

For the ascertainment of safety states or safety levels, statistics from accident research may be used or taken into consideration, for example.

Furthermore, the safety state may be ascertained for points in time in the future, for example by an evaluation of detected surroundings data or additionally received pieces of information, such as pieces of traffic information about accidents, congestions, road conditions, weather conditions etc. If the vehicle is on a freeway in a congestion, for example, and a tail end of the congestion is in sight and/or if a signal including corresponding information is received via an appropriate interface in the vehicle, and the speed of the vehicle could be increased after the congestion has ended, the future safety states of one or multiple vehicle occupant(s) may possibly worsen at the future point in time of the increase. Based thereon, an intervention in the driving state, for example in the form of a change in a route, so that the vehicle exits the freeway before the tail end of the congestion, could take place if measures are not carried out by a vehicle occupant to improve his or her safety state.

In one further specific embodiment of the method, a speed of the vehicle is adapted during the adaptation of the driving behavior.

This specific embodiment offers the advantage that the safety of the vehicle occupants may be very easily influenced via the vehicle speed, since an adaptation of the vehicle speed greatly and directly affects the safety of the vehicle occupants.

In one further specific embodiment of the present invention, a change of a planned route takes place during the adaptation of the driving behavior.

This specific embodiment of the present invention offers the advantage that no traffic disturbances, for example due to insufficient speeds on freeways or expressways, occur, if an adaptation of the driving behavior due to the safety state of a vehicle occupant should be necessary. Moreover, the route may be selected in such a way that particularly safe driving is possible, for example by traveling on routes experiencing little traffic and/or routes with a particularly low accident risk (ascertainable based on accident databases/statistics).

A further specific embodiment of the method includes the additional step of ascertaining further road users based on detected surroundings data. The adaptation of the driving behavior takes place in such a way here that a maximum relative speed between the vehicle and the further road user is not exceeded.

This specific embodiment of the present invention offers the advantage that the safety of the vehicle occupants may be enhanced by an appropriate adaptation. In an accident with a further vehicle, in particular the relative speeds are decisive for the severity of the injuries of the occupants. A corresponding adaptation consequently results in lower injury probabilities. Depending on the traveled roadway, such an adaptation may, of course, be only part of the adaptation, and is moreover limited by further conditions. If the vehicle is traveling on a road having no speed limits, the speed will, of course, not be adapted to that of a vehicle passing at an above-average speed. The relative speed, however, may be based on both vehicles moving in the same driving direction, and on oncoming vehicles.

In one further specific embodiment of the present invention, the method includes the additional step of ascertaining further road users based on detected surroundings data. The adaptation of the driving behavior takes place in such a way here that a minimum distance to the further road users is adapted.

This specific embodiment of the present invention offers the advantage that the safety of the vehicle occupants may be varied by the distances to further road users. Moreover, an occurring acceleration during braking processes may be reduced since more space is available for the deceleration. In this way, the driving comfort may be enhanced, in addition to the safety.

In one further specific embodiment of the method, the adaptation of the driving behavior takes place in such a way that an established maximum acceleration value is not exceeded, in particular, established acceleration values in the vehicle longitudinal direction and/or vehicle transverse direction.

Different measures may be implemented to achieve such a driving behavior. For example, safety distances to further road users may be increased, the speed may be adapted, for example specifically before curves situated ahead to minimize the occurring transverse accelerations, or alternative routes including corresponding road sections and/or speed limits may be approached. Moreover, the acceleration behavior or the control of an engine during acceleration may be adapted accordingly. The same applies to the adaptation of the braking behavior. To influence transverse accelerations, in particular the steering behavior may be adapted, for example by a slowed change of the steering angle or an adaptation of the steering speed. Varying the described variables may, of course, depend on different parameters, in particular the speed and the ambient conditions and/or the instantaneous driving situation.

This specific embodiment of the present invention offers the advantage that the driving behavior may be configured to be very gentle, and no hazards arise for the occupant due to excessive accelerations of the vehicle. This may, in particular, be the case when the vehicle occupant is handling pointy, hard and/or sharp objects. If the occupant is in the process of eating, the accelerations should also be reduced to prevent food from being potentially choked on, cold and in particular hot beverages from being spilled and/or other food from being dropped. The adaptation of the acceleration values plays an essential role, in particular, during the starting and final deceleration of vehicles. If the maximum acceleration values are adapted during starting and deceleration, falls and injuries of vehicle occupants may be prevented.

In one further specific embodiment of the present invention, the passenger compartment data include video data, which include pieces of information about the at least one vehicle occupant.

This specific embodiment of the present invention offers the advantage that a large number of details may be evaluated, which allow conclusions to be drawn on the safety state of the vehicle occupant.

In one further specific embodiment of the method, the passenger compartment data include sensor data which detect the occupancy of a vehicle seat, in particular sensor data of seat occupancy sensors and/or belt buckle sensors and/or seat position sensors.

Seat position sensors shall, in particular, be understood to mean sensors which indicate the position of the seat, for example the lateral position, the position of the seat back and/or a rotational position (if it is also possible to rotate the seat to the side and/or to the rear). The seat occupancy sensors may be implemented, for example, as seat mats, force and/or contact sensors and/or as optical sensors, for example as photoelectric barriers.

This specific embodiment of the present invention offers the advantage that no complex evaluation of the sensor data has to take place, but that a safety state of one or multiple vehicle occupant(s) may be detected, for example, only based on the evaluation of a seat occupancy and the seat belt fastening status. If necessary, additionally the number of the vehicle occupants may be taken into consideration in such a simplified determination of the safety state, so that persons not situated in seats are also included in the determination of the safety state.

In one further specific embodiment of the method, the ascertainment of the safety state of the vehicle occupant takes place as a function of a position of the vehicle occupant in the vehicle and/or a seat belt fastening status of the vehicle occupant and/or an object situated in the immediate vicinity of the occupant.

The object situated in the immediate vicinity of the vehicle occupant may, in particular, be objects which have such a weight and/or such a structure and substance that they may result in an injury of the occupant in the event of an accident. Objects frequently used in vehicles which may be safety-relevant are, among other things, bottles, in particular glass bottles, hot beverages, electronic devices, such as cell phones, tablets and/or laptops, heavy books, pieces of luggage, fire extinguishers or strollers. In general, these objects also include pointy or sharp objects, such as knives or other flatware.

In the immediate vicinity of the occupant shall, in particular, be understood to mean that the item or the object is positioned in such a way with respect to the occupant that it could cause harm to the vehicle occupant in the event of an accident. If this is, for example, a piece of luggage stowed securely under a seat, this is not classified as being safety critical. If, however, an item/object is situated in such a way in front of the occupant that a theoretically present deceleration path is limited, or the object could move in the direction of the body, in particular the head, of the occupant, this represents an object jeopardizing the safety of the occupant.

Whether a vehicle occupant is buckled up, objects are situated in his or her immediate vicinity and/or further safety-relevant conditions prevail may be ascertained with the aid of the detected passenger compartment data, in particular the video data and/or the sensor data detecting an occupancy of a vehicle seat.

One further specific embodiment of the method includes the step of ascertaining whether an optimization of the driving state is possible with an improved safety state of a vehicle occupant, while ensuring predefined safety requirements, with respect to the safety of the vehicle occupant.

An optimization may, in particular, be understood to mean that a vehicle speed is increased and/or an alternative route may be traveled, so that a destination to be traveled to is reached more quickly.

An improved safety state shall, in particular, be understood to mean taking up a position which is safer for the vehicle occupant in the event of a crash. This may be taken up, for example, in that the vehicle occupant moves to a seat and buckles up. If additionally hard, pointy or sharp objects are securely stowed and not used in the immediate vicinity of the vehicle occupant, this also contributes to an improvement in the safety state.

Whether predefined safety requirements may be ensured may take place, for example, based on a comparison of the present situation to reference situations, which either satisfy or do not satisfy predefined safety requirements. A present situation could be as follows, for example: The vehicle is moving on a freeway at a speed between 90 km/h and 100 km/h, the vehicle occupant is sitting upright and buckled up in a vehicle seat, with the viewing direction and the orientation of the body in the driving direction, and no safety-relevant objects are situated in the immediate vicinity of the vehicle occupant.

A comparison of the individual polled items—in this example, where is the vehicle situated, what is the vehicle speed, where is the vehicle occupant situated, is the vehicle occupant buckled up, in what direction is the vehicle occupant oriented, and are safety-relevant objects situated in the immediate vicinity of the vehicle occupant—to reference situations, which were evaluated with respect to meeting or not meeting safety requirements, and may be ascertained as to whether the present situation also meets the safety requirements.

This specific embodiment of the present invention offers the advantage that it is possible to continuously ascertain whether the driving state is optimizable and, consequently, changes to the driving state should possibly be carried out which are advantageous for the occupant. If this is the case, measures may be initiated which allow the vehicle to be operated in the optimized driving state.

In one further specific embodiment of the method, a signal is output to the vehicle occupant if an optimization of the driving state is possible with an improved safety state of the vehicle occupant.

This specific embodiment of the present invention offers the advantage that vehicle occupants are informed as to whether their instantaneous safety level results in restrictions of the driving behavior of the vehicle and, if necessary, other driving styles and paths may be taken, if the occupants behave accordingly/the occupants improve their safety state. In this way, safety is rendered experienceable in a vehicle, and a safety awareness is created, which ultimately contributes to enhancing the safety of road users.

One further advantageous specific embodiment of the present invention manifests itself in a device, in particular in a controller for an electric machine which, as a result of a computer program provided on the device, in particular on a storage medium of the device, and/or as a result of an appropriate integrated circuit, is configured to carry out a method according to the above comments. This results in synergies since the device, in particular the controller, is not only used to control the electric machine/the vehicle, but also configured to carry out the method according to the present invention.

The device may, in particular, be an electronic control unit for the vehicle. This includes appropriate interfaces for receiving and emitting signals to carry out the method underlying the present invention in a vehicle. The device may also be a device usable separately from the vehicle, which, for example, communicates via a network with the vehicle and, for example, serves as a server or is part of a server or is connected to a server.

In addition, a computer program is claimed, which is configured to carry out a method according to a method underlying this application.

Moreover, a machine-readable storage medium is claimed on which this computer program is stored.

DETAILED DESCRIPTION

Figure 1:
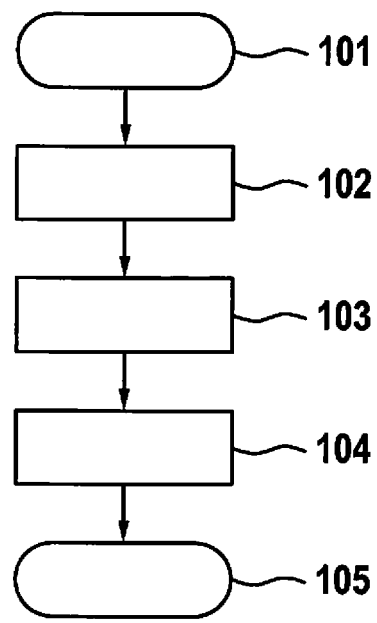
FIG. 1 shows a schematic method diagram.

In the following exemplary embodiment, the method shown in FIG. 1 is carried out on a control unit in a minivan operated in a fully automated manner, a so-called shuttle. The shuttle is equipped with multiple passenger compartment cameras and sensors for detecting a seat occupancy and a seat belt fastening status. The method starts in step 101.

In step 102, the control unit receives passenger compartment data. These include data of the passenger compartment cameras and further sensors.

In step 103, the safety state of each vehicle occupant is ascertained based on the passenger compartment data. The instantaneous position of the vehicle occupant, the seat belt fastening status and the presence of objects in the vicinity of the head of the occupant are included in the determination. Based on these data, an injury probability of the occupants during a theoretical accident is calculated. For this purpose, three respective possible accident scenarios are simulated, and the injury probabilities and possible injury severities are estimated. Based on the worst injury severity, the safety state of the vehicle occupant is subsequently determined.

In step 104, an adaptation of the driving behavior of the vehicle based on the ascertained safety state of all vehicle occupants is carried out. The driving behavior is adapted to the worst safety state (to the vehicle occupant having the highest risk of injury). The adaptation takes place in such a way that a variation of the speed is carried out.

The method ends in step 105.

In a further exemplary embodiment, the adaptation of the driving behavior additionally takes place based on surroundings data. The shuttle includes multiple surroundings sensors for this purpose, including surroundings cameras, a 360° LIDAR system, and multiple radar and ultrasonic sensors. Moreover, the shuttle includes a receiving unit with the aid of which pieces of information are retrievable from an external server, which contains instantaneous data regarding the drivable route. These include pieces of traffic information and even detailed position and speed data of further vehicles situated in the more immediate surroundings of the vehicle.

In this exemplary embodiment, the method includes the additional step of detecting surroundings data. These surroundings data are included in the ascertainment of the safety state and used for the evaluation of a possible injury severity. They are also used to adapt the possible accident scenarios in such a way that these realistically fit the instantaneous driving situation. Furthermore, in this exemplary embodiment the adaptation of the driving behavior takes place based on the surroundings data. Since, in addition to the speed, also the distance to other vehicles and the relative speed with respect to one's own speed and the speed of the other road users is adapted. Moreover, the accelerations are also controlled during the adaptation in such a way that exceeding predefined maximum accelerations may be avoided. For this purpose, the curvatures of the route driven by the shuttle are analyzed, among other things, and the speed is adapted as a function of curves.

In one further exemplary embodiment, the adaptation of the driving behavior in step 104 takes place in such a way that an established maximum acceleration value in the longitudinal direction and in the transverse direction is not exceeded. The level of the acceleration values is established as a function of the safety state. The establishment includes, in particular, an analysis with respect to objects situated in the vicinity of the vehicle occupant.

To ensure that the maximum acceleration value may not be exceeded (in emergencies, exceeding the value is always possible), multiple measures are initiated situationally. On the one hand, the control of acceleration and steering is adapted in such a way that the predefined maximum speeds are not exceeded by acceleration and steering processes. On the other hand, safety distances to preceding vehicles are increased, so that a longer deceleration path is available in the event of a necessary deceleration, whereby a reduction in the acceleration values becomes possible. Moreover, if possible and useful, alternative routes are selected on which it is possible to adhere to the acceleration values. For this purpose, the alternative routes are previously analyzed for speed specifications, curves situated ahead and with respect to present traffic.

Figure 2:
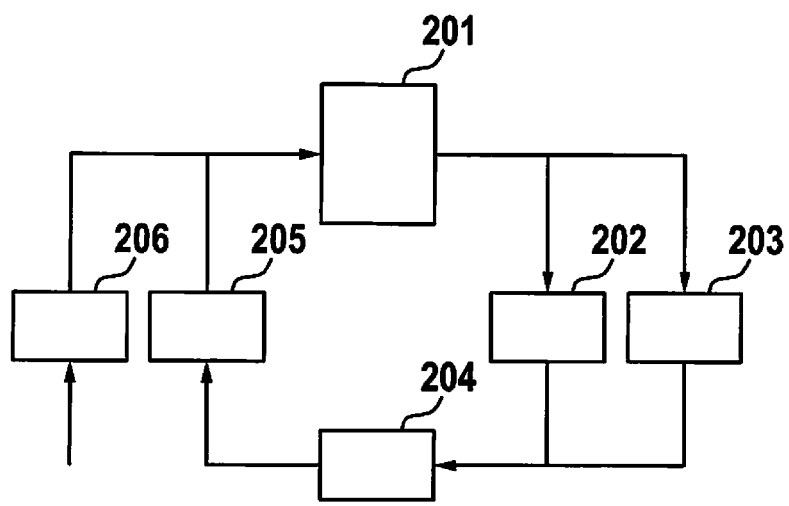
FIG. 2 shows an exemplary control loop.

FIG. 2 shows a control loop, which is used in a vehicle operated in a highly automated manner. A continuous adaptation of the vehicle takes place based on a behavior of vehicle occupants and activities in the exterior of the vehicle. For this purpose, in step 205 the behavior of the occupants in the passenger compartment, and in step 206 the exterior activities are continuously detected, and gentle measures are initiated as a consequence. The detection, evaluation and the initiation of the measures take place in step 201. The initiation of the measures targets the maintenance of a predefined safety level. In this exemplary embodiment, the measures include changes in the driving behavior, which are carried out in step 203, and changes in the passenger compartment, which are implemented in step 202. In step 203, among other things, an adaptation of the speed and a variation of a planned driving route take place, if the predefined safety level is achievable on this route with a higher probability and/or the probability of a possible impediment of further road users is lower. In step 202, an adaptation of the vehicle passenger compartment takes place. Depending on the predefined safety level and/or the safety states of the vehicle occupants, different setting options of the vehicle are enabled or disabled. This includes the free seat adjustment, so that this seat possibly becomes rotatable by 360° if the safety states and the traffic situation allow. Furthermore, trays may be extended and retracted, which possibly block space for the deceleration of occupants and thereby increase a risk of injury. Depending on the situation, this slightly worse safety state, in combination with the instantaneous driving behavior and the present traffic situation, may be sufficient to reach the predefined safety level, which is why such changes are situationally permissible. To maintain the safety level, the behavior of the vehicle occupants must moreover be permanently taken into consideration, which is represented by block 204 and again detected in the control loop in step 205.

In one further exemplary embodiment, the method is carried out in a city bus operated in an automated manner, in which multiple passenger compartment cameras are installed. Based on an evaluation of the data of the passenger compartment cameras, it is ascertained whether all occupants are sitting or vehicle occupants have only standing room. If at least one vehicle occupant is not situated on a seat, the driving behavior of the bus is adapted in such a way that it drives a maximum of 60 km/h. If every vehicle occupant has a seat, the maximum travel speed of the bus increases to 80 km/h. If additionally all occupants are buckled up, the maximum travel speed is increased to 100 km/h.

In one further exemplary embodiment, the same function is implemented in a vehicle operated in a fully automated manner. Depending on the behavior of the vehicle occupants, the driving behavior is adapted. Explicitly, no indication is provided that the behavior of the vehicle occupants should be changed. The vehicle consequently adapts its driving behavior entirely to the vehicle occupants.

Figure 3:
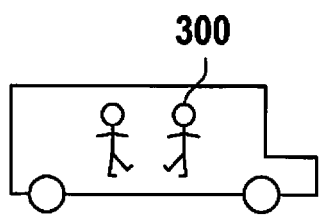
FIG. 3 shows an exemplary scenario of a coupling of maximum driving speeds to the safety state of a vehicle occupant.
Figure 3:
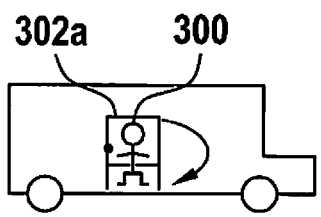
Figure 3:
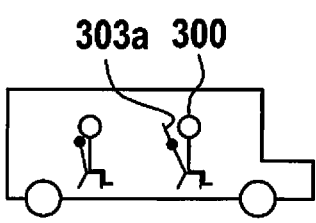
Figure 3:
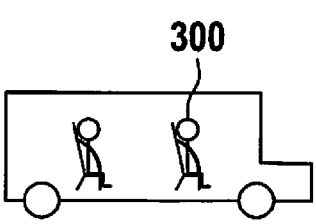

FIG. 3 shows further options by way of example, based on which an adaptation of the driving behavior may be carried out. These adaptations are initially independent of the selection of the vehicle. In general, the method described in this application may be carried out in arbitrary vehicles, be it land, air or water vehicles. Each vehicle may carry out such an intervention in its driving behavior that the safety of the vehicle occupants is changed thereby. If hazardous objects are situated in the vicinity of the vehicle, even the smallest changes in movement and/or acceleration are safety-relevant for a change in an accident risk.

In first situation 301 shown in FIG. 3, for example, a maximum speed is set based on whether vehicle occupants 300 are standing, and possibly in which direction they are looking. In this exemplary embodiment, the maximum speed is 25 km/h when occupants are standing in the vehicle, regardless of the viewing direction.

In situation 302, an adaptation of the speed takes place based on a seat setting of a vehicle seat 302*a*. In this exemplary embodiment, it is based on the angle by which seat 302*a* was rotated to one side. If the seat is not oriented forward in the driving direction, the maximum speed in this exemplary embodiment is 80 km/h.

In situation 303, the inclination of a seat back 303*a* is detected and included in the adaptation of the driving behavior. If the seat back is not completely upright, the maximum speed in this exemplary embodiment is 80 km/h.

In situation 304, all vehicle occupants 300 are situated in an optimal sitting position and are buckled up. Based on this best-possible safety state of occupants 300, the vehicle may be operated with an accordingly adapted higher maximum speed. This speed is 100 km/h in this exemplary embodiment.

In one further exemplary embodiment, the design or instantaneous configuration of a vehicle passenger compartment is included. For example, the speed of the vehicle may be reduced when a tray is folded down in front of the occupant (such as in an airplane) so that he or she is able to comfortably work on something or eat something, for example. At a high speed, however, a seat belt would not restrain the occupant well enough, whereby he or she would be pushed into the table by the deceleration, and the risk of an injury would rise. By reducing the speed, the seat belt is able to intercept the forward displacement to such an extent that an accident does not result in increased injury severity, despite the table.

In one further exemplary embodiment having multiple options, it is communicated/indicated to the occupant why, for example, the speed was further reduced, so that the occupant is able to respond as he or she desires.

In one further exemplary embodiment, the route is adapted in accordance with the behavior in the passenger compartment. When an occupant unbuckles, a switch may be made, for example, from a freeway onto a rural road to keep the maximum risk of injury during an accident constant. It is also possible to select the route in such a way that, for example, strong transverse accelerations are avoided, for example when an occupant is handling a sharp/pointy object, which could result in an injury.

In one further exemplary embodiment, the route planning is adapted, and it is pointed out to the occupant that the new behavior is not possible until a certain distance/time duration later, when the route has been adapted. In contrast to a warning of a prohibitive nature, this presents the restriction to the occupant as an option in a foreseeable time, which may positively affect the driving experience and may result in an acceptance of the proposed behavior.

In one further exemplary embodiment, a tour bus operated in an automated manner is situated in a traffic jam, and occupants are walking around in the bus. Passenger compartment cameras are installed in the bus, based on whose data the behavior of the vehicle occupants is ascertained. Since the vehicle occupants are presently walking around in the bus, the driving function of the bus is adapted in such a way that it is operated at a maximum of 25 km/h. Since it was ascertained, based on data detected with the aid of a camera installed on the bus, that the congestion will clear up within the next 500 m, an information signal is output to the vehicle occupants based on these pieces of information. It points out to the vehicle occupants that they are to sit down and buckle up to attain the regular travel speed again.

A warning function when leaving the seat during a traffic jam, in contrast, would rather bother the occupants than it would assist during the trip, which underscores the advantage of the present invention.

To generate this warning signal at a useful point in time, initially it has to be ascertained whether an optimization of the driving state is even possible with an improved safety state of a vehicle occupant, while ensuring predefined safety requirements, with respect to the safety of the vehicle occupants. In this exemplary embodiment, this ascertainment takes place based on the surroundings data, the passenger compartment data, and based on predefined safety requirements. The safety requirements are stored in a memory situated in the bus and contain reference situations to which the instantaneous situation is compared. The comparison includes the instantaneous speed, the road type and the safety state of the vehicle occupants. In this exemplary embodiment, it is consequently established that, in the near future, an increase in the speed, while adhering to the safety requirements, is only possible when all vehicle occupants return to their seats and sit down.

In this exemplary embodiment, the safety state of all vehicle occupants is ascertained based on the data of the passenger compartment cameras. In the case of multiple occupants, the driving state is adapted in such a way that the safety of the vehicle occupant having the worst safety state (highest risk of injury) is ensured. If all occupants, with the exception of one occupant, are sitting on their seats with the seat belt fastened, for example, the bus is nonetheless operated at no more than 25 km/h until the safety state of all vehicle occupants has improved.

In one further exemplary embodiment, a holistic approach is selected, and the risk of injury is reduced in equal measure for all occupants.

The approach from the exemplary embodiments may be implemented particularly advantageously in a so-called "robo shuttle"/POD, but is not limited thereto. In this way, the present invention may also be used in a pilot system having a level 3 automation level. It may thus become possible, for example, to extend the transfer time of a vehicle to a driver in the event of "misconduct" of the driver (e.g., interaction with an impermissible object), whereby more comfortable and still safe driving becomes possible.

In another even more favorable variant, the present invention is at least partially implemented in an assistance system. In this way, it is possible, for example, to automatically adapt the maximum speed of an ACC system or of a speed limiter to keep the risk during an accident low when an occupant unbuckles.

In one further exemplary embodiment, the method for adapting a driving behavior is used in a shuttle operated in an automated manner.

Jerky, forceful starting or deceleration in vehicles for (public) passenger transportation may result in falls or injuries in particular in older passengers when they are standing and not holding on to a handle or similar devices. In conventional buses and other driver-steered vehicles, the point in time of starting/deceleration is partially apparent based on the traffic situation, state of traffic lights etc., so that passengers automatically stabilize themselves. The fact that a need for warning still exists becomes clear, for example, based on many bus lines of the Tokyo metropolitan area, in which bus drivers inform the passengers prior to each starting with the announcement "Caution please, we are starting to move."

In an automatically driving taxi/shuttle system, the driving strategy and the points in time of starting or deceleration are less obvious, intensified by possible incorrect sensor decisions, which are still unavoidable according to today's state. It is therefore to be expected that standing, unsecured passengers are exposed to an increased risk of falling or injury during, to them, unexpected starting or deceleration.

In this exemplary embodiment, the driving behavior of the shuttle is therefore adapted in such a way that an adaptation of the maximum acceleration takes place as a function of an ascertainment of whether every standing passenger is using a handle.

To establish whether passengers are unsecured, it is established with the aid of a passenger compartment camera in which positions passengers are generally situated. In these positions, it is checked by additional sensor systems, in this exemplary embodiment by pressure sensors and on the seats and by tensile and capacitive sensors on the handles, whether every passenger is either sitting or is using a handle. If a passenger who is not sitting or holding on is detected in at least one position, the situation is considered to be potentially hazardous.

If the situation is classified as being potentially hazardous based on the monitoring of the passenger compartment, and the shuttle is in the process of planning a starting or deceleration maneuver, the following measures are taken to avoid falls and injuries of the passengers:

Initially, an acoustic warning is issued via announcement to the passengers. Thereafter, if the traffic situation allows it (among other things, sufficient space is available for the deceleration of other vehicles), the vehicle acceleration/deceleration and its derivative (jerk) are comfortably reparameterized, so that the starting and deceleration are made gentler.

In one further exemplary embodiment, the starting is completely suppressed until a safe state of the passengers is reached. The suppression time is limited in terms of time, since the passenger compartment monitoring sensor system could also erroneously classify a potentially hazardous state, which would result in a permanent standstill of the shuttle.

In one further exemplary embodiment, the system is reparameterized when negotiating a curve, so that lower transverse accelerations are achieved. In this way, the risk of falling may also be addressed in curves.

What is claimed is:

1. A method for a vehicle, the method comprising:
    ascertaining, for at least one occupant of the vehicle and based on passenger compartment data, a probability that the at least one occupant of the vehicle would sustain an injury if an accident would occur;
    adapting a drive of the vehicle based on the ascertained probability;
    ascertaining whether an optimization of the drive, to increase a speed of the vehicle and/or to switch to an alternative route by which a destination can be reached quicker than by using a currently set route, is possible in response to a change to an improved safety state of one or more of the at least one occupant that reduces the ascertained probability; and
    outputting a signal in the vehicle indicating to the at least one occupant the possibility of the optimization of the drive by the at least one occupant effecting the change to the improved safety state of the one or more of the at least one occupant.

2. The method of claim 1, further comprising:
    receiving surroundings data, wherein the ascertainment of the probability and/or the adaptation of the drive is based on the ascertained surroundings data.

3. The method of claim 1, wherein the adapting includes adapting a speed of the vehicle.

4. The method of claim 1, wherein the adapting includes changing a planned route of the vehicle.

5. The method of claim 1, further comprising:
    ascertaining further road users based on detected surroundings data, the adaptation of the driving behavior occurring so that a maximum relative speed between the vehicle and the further road user is not exceeded.

6. The method of claim 1, further comprising:
ascertaining road users based on detected surroundings data, the adaptation occurring so that a minimum distance to the road users is adapted.

7. The method of claim 1, wherein the adaptation occurs so that an established maximum acceleration value is not exceeded.

8. The method of claim 1, wherein the passenger compartment data include video data that contain pieces of information about the at least one occupant.

9. The method of claim 1, wherein the passenger compartment data include sensor data that detect occupancy of a vehicle seat.

10. The method of claim 8, wherein the ascertainment of the probability occurs as a function of a position of the at least one occupant, a seat belt fastening status of the at least one occupant, and/or an object situated inside the vehicle in an immediate vicinity of the at least one occupant.

11. The method of claim 1, wherein the adaptation occurs so that an established maximum acceleration value is not exceeded in a longitudinal direction of the vehicle.

12. The method of claim 1, wherein the adaptation occurs so that an established maximum acceleration value is not exceeded in a longitudinal direction of the vehicle and in a transverse direction of the vehicle.

13. The method of claim 1, wherein the passenger compartment data include sensor data regarding a state of a belt buckle, regarding a seat position, and/or regarding a handle.

14. A device, comprising:
an adapting unit of a vehicle, wherein the adapting unit is configured to perform a method comprising:
ascertaining, for at least one occupant of the vehicle and based on passenger compartment data, a probability that the at least one occupant of the vehicle would sustain an injury if an accident would occur;
adapting a drive of the vehicle based on the ascertained probability;
ascertaining whether an optimization of the drive, to increase a speed of the vehicle and/or to switch to an alternative route by which a destination can be reached quicker than by using a currently set route, is possible in response to a change to an improved safety state of one or more of the at least one occupant that reduces the ascertained probability; and
outputting a signal in the vehicle indicating to the at least one occupant the possibility of the optimization of the drive by the at least one occupant effecting the change to the improved safety state of the one or more of the at least one occupant.

15. A non-transitory computer readable medium on which is stored a computer program that includes program code that is executable by a processor and that, when executed by the processor, causes the processor to perform a method, the method comprising:
ascertaining, for at least one occupant of a vehicle and based on passenger compartment data, a probability that the at least one occupant of the vehicle would sustain an injury if an accident would occur;
adapting a drive of the vehicle based on the ascertained probability;
ascertaining whether an optimization of the drive, to increase a speed of the vehicle and/or to switch to an alternative route by which a destination can be reached quicker than by using a currently set route, is possible in response to a change to an improved safety state of one or more of the at least one occupant that reduces the ascertained probability; and
outputting a signal in the vehicle indicating to the at least one occupant the possibility of the optimization of the drive by the at least one occupant effecting the change to the improved safety state of the one or more of the at least one occupant.

16. The computer readable medium of claim 15, wherein the method further comprises:
receiving surroundings data, wherein the ascertainment of the probability and/or the adaptation of the drive is based on the ascertained surroundings data.

17. A method for a vehicle, the method comprising:
ascertaining, based on passenger compartment data, a current safety state of an occupant of the vehicle, wherein the ascertainment of the current safety state includes determining:
whether a seat belt associated with the occupant is buckled;
whether an object that is inside the vehicle and that is classified as hazardous is in close proximity to the occupant or to a particular region of the occupant; and/or
whether an object that is inside the vehicle is positioned relative to the occupant so as to limit a deceleration path of the occupant;
adapting a drive of the vehicle based on the ascertained current safety state;
ascertaining whether an optimization of the drive, to increase a speed of the vehicle and/or to switch to an alternative route by which a destination can be reached quicker than by using a currently set route, is possible in response to a change from the current safety state to an improved safety state of one or more of the occupant that reduces the ascertained probability; and
outputting a signal in the vehicle indicating to the occupant the possibility of the optimization of the drive by the occupant effecting the change to the improved safety state of the occupant.

18. The method of claim 17, wherein the ascertainment of the current safety state includes the determining of whether the seat belt associated with the occupant is buckled.

19. The method of claim 17, wherein the ascertainment of the current safety state includes the determining of whether the object that is inside the vehicle and that is classified as hazardous is in close proximity to the occupant or to the particular region of the occupant.

20. The method of claim 17, wherein the classification of the object as hazardous is based on a weight and/or a sharpness of the object.

21. The method of claim 17, wherein the ascertainment of the current safety state includes the determining of whether an object that is inside the vehicle is positioned relative to the occupant so as to limit a deceleration path of the occupant.

22. A method for a vehicle, the method comprising:
ascertaining an unsafe state of an occupant of the vehicle based on passenger compartment data;
selecting one or more driving parameters for a non-optimized drive of vehicle based on the ascertained unsafe state of the occupant;
determining that the unsafe state of the occupant can be removed by a modification to a position of the occupant relative an object that is in the vehicle; and
responsive to the determination, outputting a signal in the vehicle indicating to the occupant that the drive of the vehicle can be changed to an optimized drive, to increase a speed of the vehicle and/or to switch to an alternative route by which a destination can be reached quicker than by using a currently set route, with the occupant performing the modification.

23. The method of claim 22, wherein the modification includes buckling a seat belt.

24. The method of claim 22, wherein the modification includes clearing the object away from an area in the vehicle that is immediately in front of the occupant.

* * * * *